United States Patent [19]

Vander Maas

[11] Patent Number: 4,779,327
[45] Date of Patent: Oct. 25, 1988

[54] DRILL PRESS SUPPORTED PLATFORM FOR PIN ROUTER

[76] Inventor: Laddie J. Vander Maas, 194 W. Hills Rd., Huntington Station, N.Y. 11746

[21] Appl. No.: 93,611

[22] Filed: Sep. 8, 1987

[51] Int. Cl.[4] .......................... B23P 23/06; B27C 5/10
[52] U.S. Cl. ...................................... 29/560; 144/1 F; 408/20; 409/144
[58] Field of Search .............. 29/560, 26 A; 409/180, 409/182, 144; 144/1 F, 1 R, 134 B, 252 R; 408/20, 22

[56] References Cited

U.S. PATENT DOCUMENTS

| | | | |
|---|---|---|---|
| 2,549,934 | 4/1951 | Saucke | 29/560 |
| 2,669,162 | 2/1954 | Arliss | 409/144 |
| 3,783,915 | 1/1974 | Bryden | 144/134 B |
| 4,312,391 | 1/1982 | Snow | 144/1 F |
| 4,397,342 | 8/1983 | North | 144/1 F |
| 4,454,898 | 6/1984 | Pavnica | 144/1 F |
| 4,463,785 | 8/1984 | Goeken | 144/1 F |

*Primary Examiner*—William R. Briggs
*Attorney, Agent, or Firm*—Leonard Belkin

[57] ABSTRACT

Apparatus and method for utilizing a drill press for converting a portable router into a pin router. A plate for supporting the router is mounted on the drill press by attaching a shaft on the plate to the chuck of the drill. An arm is provided to prevent router reaction forces from producing rotation of the router. Provision is made to mount the guide pin for the pattern on the drill press table.

6 Claims, 2 Drawing Sheets

DRILL PRESS SUPPORTED PLATFORM FOR PIN ROUTER

BACKGROUND OF THE INVENTION

The present invention relates to a drill press support for a router and more particularly to the utilization of a drill press to support a router and provide the adjustability required for efficient use of the router as a pin router.

A router is an electric power tool which has a rotating verticle spindle and chuck for receiving a cutter bit. The cutter bit is used to produce grooves of various cross section depending on the shape of the bit, and can also be utilized to chamfer the edges of the work piece, generally wood.

A pin router is a router which is guided by a pin extending up from a work table. A guide is placed on the work table and and is provided with grooves which engage the pin. The stock or workpiece is placed on the guide. The router is mounted above the stock with the cutter bit extending down to come in contact with the stock. The guide is moved, usually manually, along the pin in the grooves in order to insure that the cutter bit cuts exactly in conformance with the guide.

The pin router is an effective and useful device except that the cost of such equipment is generally beyond the means of the average home craftsman or hobbyist. The router by itself is not generally prohibitive in cost, but without the remaining assembly to obtain the pin routing, the advantages of the latter are not available to the hobbyist with the router alone.

The state of the art of pin routing and similar machines is shown in U.S. Pat. Nos. 3,635,268, 3,783,915, 3,923,086, 4,044,805, 4,484,608, and 4,606,386. These patents show various elaborate and expensive devices to obtain guidance for the cutting tools. In Ferdinand et al ('608) in particular, it is seen that there is an attempt to reduce the cost and complexity of apparatus to provide the benefits of a pin router. However, the device is still complex, expensive, and rather bulky for the typical home craftsman or amateur shop worker.

SUMMARY OF THE INVENTION

In the present invention there is provided method and apparatus utilizing a drill press and similar tools quite often found in the work shops of many home or amateur craftsmen to convert the ordinary router into a pin router.

It has been found that the ordinary drill press, in common use by home craftsmen, can readily be adapted for use in converting the ordinary router into a reliable and efficient pin router.

In accordance with a preferred embodiment of this invention there is provided a drill press having a work platform, a holder for supporting a chuck above and facing the platform, and provision for positioning the chuck. On the platform is mounted an upwardly extending guide pin, while a plate is provided to be egaged with and supported by the chuck for carrying a router whose cutting tool faces the platform. A piece of stock or the workpiece mounted on a guide having a groove for engagement with the pin may be placed on the platform and the router may be moved into cutting engagement with the stock which may be moved along with the guide on the pin to obtain cutting of the stock in accordance with the groove on the guide.

It is therefore a principal object of this invention to provide apparatus for adapting an ordinary router for use as a pin router.

Other objects and advantages of this invention will hereinafter become obvious from the following description of preferred embodiments of this invention.

DETAILED DESCRIPTION OF THE PREFERRED EMBODIMENTS

Figure 1:
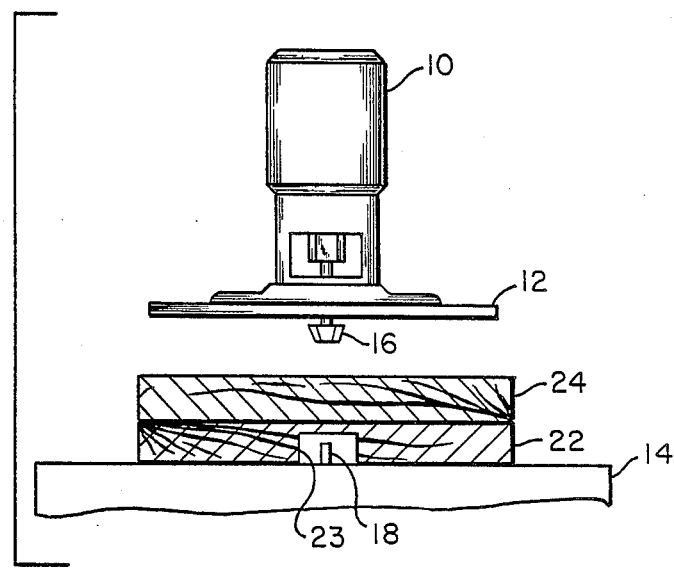
FIG. 1 is an elevation view, partially schematic, illustrating the operation of a pin router.

For a brief description of pin router and the manner in which it functions, reference is made to FIG. 1 which illustrates a router 10 mounted on a platform 12 spaced from a table 14. Extending from router 10 down through an opening in platform 12 is the router bit 16 of suitable shape and size for the particular application. Router 10 here and elsewhere is shown without the handles which are customarily attached to such devices in order not to clutter up the illustrations.

On table 14 extending upwardly is a pin 18. Pattern 22 containing one or more grooves to accomodate pin 18 rests on table 14 with pin 18 riding in groove 23 in pattern 22. Resting on pattern 22 is the stock or workpiece 24 in which the pattern of grooves in pattern 22 is to be duplicated. Workpiece 24 would be attached to pattern using screws or brads (not shown).

As is understood in the art, platform 12 is lowered until router bit 16 enters stock or workpiece 24 and the pattern 22 along with stock or workpiece 24 are moved so that bit 16 duplicates to design in pattern 22.

Typically, router 10 spins its bit at 22,000 rpm or more. The device has proven to be very versatile, being able to shape decorative edges or grooves in a large range of styles and sizes. By combining cuts with several bits, it is possible to duplicate or create almost any type of molding. However, due to the high speed of the router, a substantial reaction twisting force is produced which must be counterbalanced in some way. Portable routers must be handled very carefully by the craftsman, and mounted routers usually have some provision to contain that force.

Commercially available pin routers, designed to accomodate the characteristics described above, are of necessity generally bulky and expensive, making them out of the reach of most home or amateur craftsmen.

In my invention, the hand held or portable router is adapted for use as a pin router, with a drill press, or similar equipment, quite often already in the possession of many home or amateur craftsmen.

Figure 2:
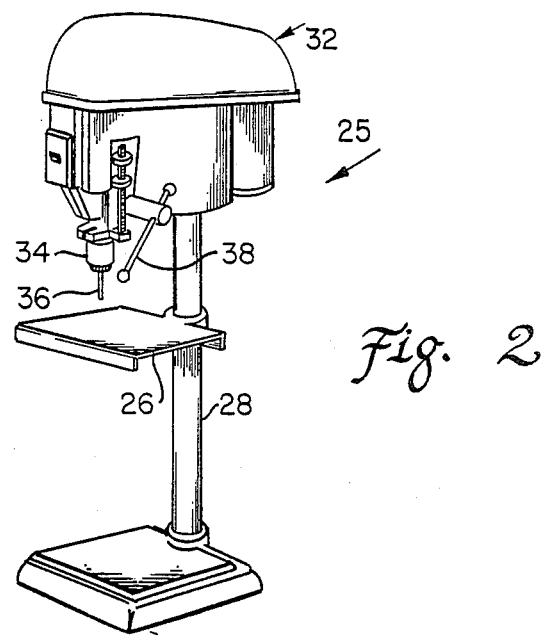
FIG. 2 is an isometric view, partially schematic, of a typical drill press commonly in use.

Referring to FIG. 2, there is shown a typical drill press 25 consisting of table 26 supported slidably on a column 28, and a motor housing 32 from which extends downwardly a chuck 34 holding a bit 36 in engagement.

A feed handle 38 is employed to raise or lower bit 36. Press 25 would be electrically operated. The stock or workpiece (not shown) would be placed on table 26, clamped in place directly under bit 36 where the hole is to be drilled, and handle 38 lowered to bring rotating bit 36 into contact with the stock. During the operation of this invention, drill press 25 would not be in electrical operation, that is, electrical power to press 25 would be cut off.

The purpose of the present invention is to provide a mounting plate for a router, to support that plate by chuck 34, include provision to prevent rotation of the plate, and effectively to convert a drill press, with little expenditure of funds and effort, into a pin router, requiring little or no extra space to accomplish that result.

Figure 3:
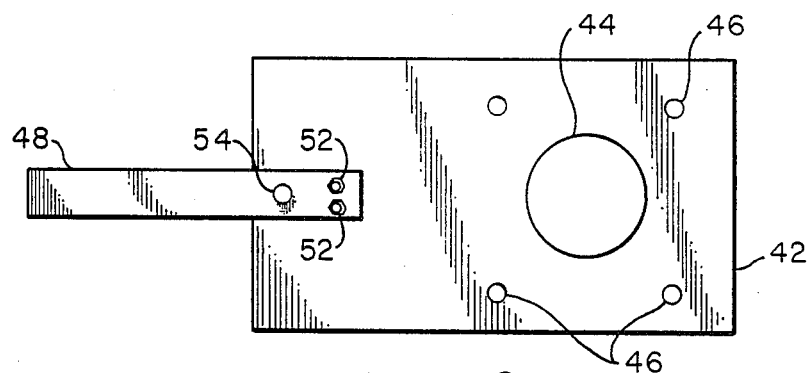
FIG. 3 is a plan view of a supporting plate for a router made in conformance with the principles of this invention.

Referring to FIG. 3 there is illustrated a plate 42 containing an opening 44 and a plurality of holes 46. Attached to and extending from plate 42 is an arm 48 attached by any convenient means such as bolts 52 to plate 42. A shaft 54, about the length of the shank of a drill, and of the same diameter, extends up from arm 48, for a reason to be described below.

Figure 4:
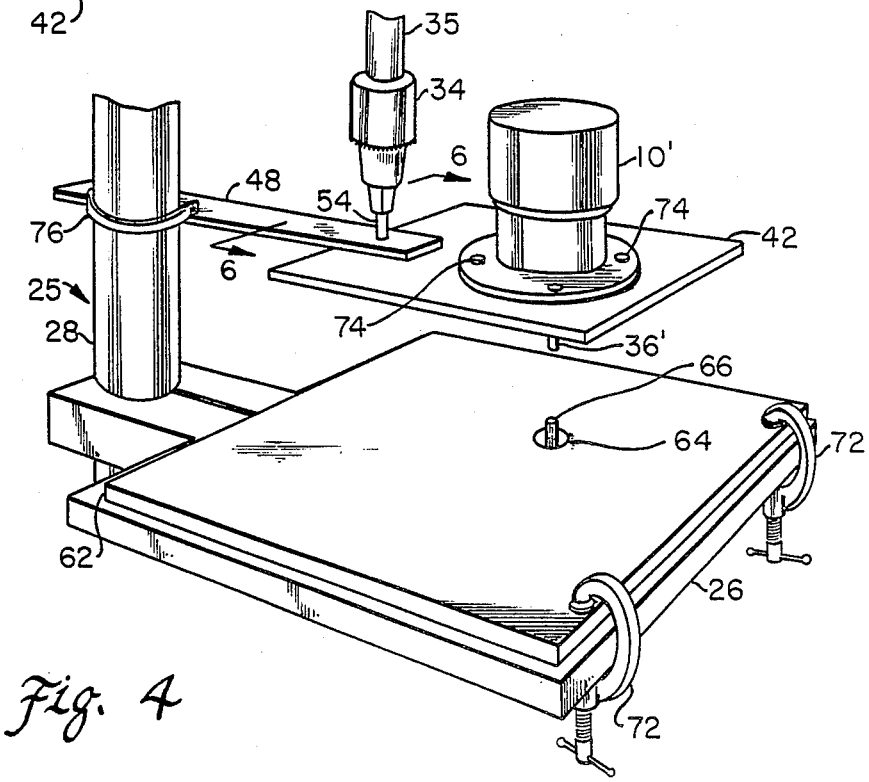
FIG. 4 is an isometric view, partially schematic, of the drill press shown in FIG. 2 modified in accordance with the principles of this invention.

Referring to FIG. 4, there is shown drill press 25 with column 28, table 26, and chuck 34 on the end of a shaft 35. It will be noted that mounted on table 26 is a board 62 with an opening 64 from which protrudes a guide pin 66. Pin 66 could extend up from a base (not shown) which is held in place by board 62 and bolted thereto or held in place by clamps 72. Pin 66 serves the purpose described for pin 18 shown in FIG. 1.

Plate 42 is mounted on drill press 25 above table 26 by inserting the end of shaft 54 into chuck 34 and tightening the latter. Arm 48 extends past and is in contact with column 28. The butting of arm 48 against column 28 prevents the reactive force of router 10' from rotating plate 42, as described above. A U-shaped rod 76 surrounding column 28 attached at its ends by bolts to arm 48 may be employed to avoid any vibration during start or shut down.

Router 10' is mounted as shown on plate 42 with bit 36' protruding through plate 42. Screws or bolts 74 are employed to attach router 10' to plate 42, holes 46 being used for this purpose. Additional holes 46 may be made as required using drill press 25.

Figure 5:
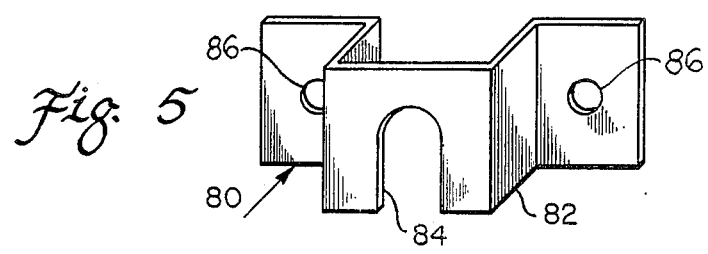
FIG. 5 is an isometric view of a safety bracket which may be employed with the preferred embodiment.

As a safety feature, a bracket 80 shown in FIG. 5 may be employed to insure that arm 48 does not come loose from chuck 34. Bracket 80 consists of a bent plate member 82 with a slot 84 large enough to accomodate shaft 35 and a pair of holes 86 to permit the bolting of bracket 80 to plate 42.

Figure 6:
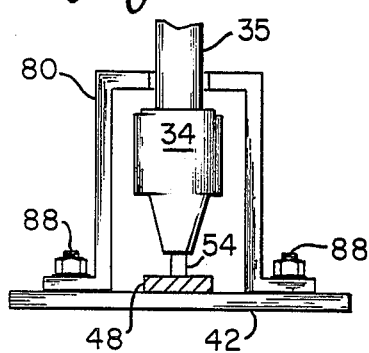
FIG. 6 is a view taken along 6—6 of FIG. 4 showing the addition of the safety bracket illustrated in FIG. 5.

As seen in FIG. 6, bracket 80 is attached to plate 42 by a pair of studs 88. This arrangement insures that plate 42 will not come loose from chuck 34.

In the operation of the apparatus described, board 62 is clamped on table 26 of drill press 25 with guide pin 66 fixed as illustrated. Then router 10' is mounted on plate 42 which is attached to chuck 34 utilizing shaft 54, with arm 48 located next to column 28, and aligning bit 36' with pin 66. Pattern 22 and stock or workpiece 24 would then be place in usual fashion on board 62 as is shown in FIG. 1.

Router 10' is then turned on, plate 42 is lowered using feed handle 38 and locked in place, and the pattern 22 along with its stock or workpiece 24 moved with pin 66 in the groove of pattern 22.

It is thus seen there has been provided a unique, yet simple and economic method and apparatus for adapting a drill press to function as a pin router.

While only certain preferred embodiments of this invention have been described, it is understood that many variations of this invention are possible without departing from the principles of this invention as defined in the claims which follow.

What is claimed is:

1. In combination, a drill press having a work platform, column means for supporting a chuck above and facing said platform, means for positioning said chuck, means on said platform for supporting an upwardly extending guide pin, and plate means having means engaged with and supported by said chuck and for carrying a router whose cutting tool faces said platform whereby a workpiece mounted on a guide having a groove for engagement with said pin may be placed on said platform and said router may be moved into cutting engagement with said workpiece which may be moved along with said guide on said pin to obtain cutting of said workpiece in accordance with the groove on said guide, said plate means including a horizontally extending plate having a pin to engage said chuck, and an opening to accommodate said router on top and the bit of said router extending down through said plate.

2. The combination of claim 1 in which said plate has an arm extending therefrom for engaging said column means to prevent counter rotation of said plate in reaction to the operation of said router.

3. The combination of claim 2 having safety bracket means attached to said plate means for engaging said chuck to insure that said plate means has not come loose from said chuck.

4. The combination of claim 2 having means for producing a positive engagement of said arm to said column.

5. The method of adapting a drill press for using a router as a pin router comprising the steps of mounting on the work table of said drill press an upwardly extending guide pin, attaching a plate for supporting said router to the chuck of said drill press so that said router may be oriented by said drill press for contact with the workpiece, said plate having mounted thereon a pin for engagement to and support by said chuck, and preventing rotation of said plate while said router is in use.

6. The method of claim 5 in which said plate has an arm extending therefrom for contacting a portion of said drill press to prevent said rotation of said plate.

* * * * *